United States Patent [19]

Gray

[11] 4,042,406
[45] Aug. 16, 1977

[54] BUILDING MATERIAL

[76] Inventor: Benjamin Gray, 167 Grandview Ave., Nanuet, N.Y. 10954

[21] Appl. No.: 721,618

[22] Filed: Sept. 8, 1976

Related U.S. Application Data

[63] Continuation-in-part of Ser. No. 606,375, Aug. 20, 1975, abandoned.

[51] Int. Cl.² ............................................. C04B 7/02
[52] U.S. Cl. ...................................... 106/88; 106/90; 106/97; 106/DIG. 2
[58] Field of Search ...................... 106/90, 97, DIG. 2

[56] References Cited

U.S. PATENT DOCUMENTS

| 2,004,545 | 6/1935 | Wolf et al. | 106/90 |
| 2,858,227 | 10/1958 | Rodsky | 106/97 |
| 3,847,633 | 11/1974 | Race | 106/97 |

*Primary Examiner*—J. Poer
*Attorney, Agent, or Firm*—Leo C. Krazinski

[57] ABSTRACT

A lightweight block for interior partitions of buildings weighing less than one-half of any type of lightweight concrete block now manufactured, formed of a mixture of 10.66:1 ratio of expanded perlite aggregate and Portland cement, a water cement ratio of 6.66 gallons of water to 1 cubic foot of cement and an additive for making the mixture tractable, no other aggregate or binder being included.

9 Claims, No Drawings

BUILDING MATERIAL

This application is a continuation-in-part application of U.S. patent application Ser. No. 606,375, filed Aug. 20, 1975, now abandoned.

BACKGROUND OF THE INVENTION

1. Field of the Invention

This invention relates to an extra lightweight non-load bearing building block, specifically for construction of interior building partitions or other non-load bearing interior walls. The block may be formed into standard or modular size building blocks similar in shape to commonly used concrete blocks, cellular or solid form.

2. The Prior Art

Heretofore, various types of concrete blocks have been manufactured and commonly used in construction for many years, such as cinder concrete block, stone concrete blocks and lightweight concrete blocks. The cinder concrete block, used in many instances for load-bearing, has lost favor in the construction industry because of its' structural instability. The stone concrete block and lightweight concrete block are used for their load-bearing capabilities and in certain cases the lightweight concrete block is used for partitions. Because of weight however, existing lightweight concrete blocks are not commonly used for partitions and have been replaced by gypsum wall board or sheet rock partitions made of steel or wood studs and faced on both sides with gypsum wall board or sheet rock.

Existing lightweight concrete blocks are manufactured of expanded aggregates known as SOLITE, NYTRALITE, PUMICE, EXALITE and WAYLITE and are manufactured in standard and modular sizes, in cellular and solid form. SOLITE, NYTRALITE, EXALITE and WAYLITE are trade names for expanded shale. PUMICE is a variety of volcanic glass, full of minute cavities and very light in weight. These blocks are manufactured by using expanded shale or PUMICE, sand, cement and water in various mixes. The average weight of these commonly used lightweight blocks using a nominal 4 × 8 × 16 inches, three celled block as an example, range from 16.5 pounds to 18.2 pounds each, with an average weight, in place, in a wall including cement joints of 21 pounds per square foot.

Lightweight aggregates including perlite as an ingredient with clay are well known in the art, as evidenced in U.S. Pat. Nos. 2,699,409, and 2,728,733. Further building material employing expanded perlite, Portland cement and hydraulic binder with an additive is also well known, as evidenced in U.S. Pat. Nos. 2,858,227 and in 3,847,633 using additional aggregates and hydraulic binders.

SUMMARY OF THE INVENTION

Accordingly, an object of this invention is to provide an improved extra lightweight non-load bearing building block for use in preparation of interior partitions or walls of buildings.

Another object of the invention is to provide an improved extra lightweight non-load bearing block containing expanded perlite, as the only aggregate, and a plasticizer.

Still another object of the invention is to provide an improved extra lightweight non-load bearing block that can accept any surface finish now used in the construction industry.

A further object of the invention is to provide an improved extra lightweight non-load bearing block that is fire resistant, has excellent accoustical properties and can stand extreme abuse when used for non-load bearing interior partitions of walls.

A still further object of the invention is to provide an improved extra lightweight non-load bearing block that can be economically manufactured with present day block manufacturing equipment.

Other and further objects will be obvious upon an understanding of the illustrative embodiment about to be described, or will be indicated in the appended claims and various advantages not referred to herein will occur to one skilled in the art upon employment of the invention in practice.

DESCRIPTION OF PREFERRED EMBODIMENT

In accordance with the present invention the foregoing objects are generally accomplished by providing a building material, such as a block, extra light in weight, non-load bearing and for use for interior partitions or other non-load bearing walls on the interior of buildings. In the size of this block, which is similar to the standard or modular concrete block, now used in the building industry, a nominal 4 × 8 × 16 inches, three celled block as an example, weighs from 7 pounds 4 ounces to 7 pounds 12 ounces maximum, with an average weight, in place, in a wall including cement joints of 10.16 pounds per square foot. The air dry density (specific gravity) of the finished product is 41.2 pounds per cubic foot or 10.815 grams per cubic inch. Compression tests of this block have been made simulating a laid-up in the wall condition. In ultimate compression using a nominal 4 × 8 × 16 inches, three celled standard block, the block tested at 490 pounds per square inch of gross area, or 787.01 pounds per square inch of the net area. This non-load bearing block in place, for a partition or wall, can safely carry any height non-load bearing partition or wall used in building construction, as specified by all building codes nationally for the thickness of the block used.

This block is manufactured of expanded perlite conforming to ASTM C332 modified and manufactured classification as A-20, concrete grade, high-early strength Portland cement type IIIA, water and an additive to make the mixture tractable. No other aggregate or binder is used. Perlite is a petrographic term for a naturally occurring siliceous volcanic rock containing a small amount of combined water. When crude perlite ore particles are heated to plasticity, they expand 4 to 20 times their original volume, creating countless sealed air cells.

The expanded perlite aggregate shall have a maximum dry density of 8 pounds per cubic foot loose and 9 pounds per cubic foot compacted, and shall be sized as follows:

| GRADATION | VOLUME |
|---|---|
| + 8 mesh | 8 to 14% |
| + 16 mesh | 60 to 70% |
| + 30 mesh | 15 to 20% |
| + 50 mesh | 3 to 8% |
| + 100 mesh | 0 to 5% |

The additive necessary to make the mixture of expanded perlite, high-early strength Portland cement type IIIA, and water tractable, is a mixture of 50% solids concentrate of triethanolamine salt of linear alkylate sulfonic acid, more properly termed triethanolamine salt of P-dodecyl benzene sulfonic acid and 50% water.

The mix required shall be 10.66:1 (10.66 cubic feet of expanded perlite to 1 cubic foot (1 bag) of high-early strength Portland cement type IIIA), and a water cement ratio equal to 6.66 gallons of water to 1 cubic foot of cement. To this mix shall be added 0.67 to 1 pint of a mixture of 50% solids concentrate of triethanolamine salt of P-dodecyl benzene sulfonic acid and 50% water. The mixture is known in the trade by the trademark "MARK V" manufactured by Forrer Chemical Co. of Milwaukee, Wis., and its chemical formula is $C_{12}H_{25}$—$(C_6H_4)$—$SO_3H.N(C_2H_4OH)_3$.

Equipment for the manufacturing process shall comprise a Besser or equivalent automatic mixer and a Besser V3R block molding machine or equivalent with adjustable vibration cycle timing, bins, chutes, conveyors and steam curing facilities.

Manufacturing process shall be as follows: The expanded perlite aggregate shall be predampened and dumped into the mixer, feeding the required amount of cement and mixed for about 1 minute or until the cement is properly mixed with the expanded perlite aggregate. Water shall then be added as the mixer continues to operate until the total of 6.66 gallons have been used for the mix, as described hereinbefore. The MARK V additive shall be added after the final water enters the mix. The above mentioned amount of material shall be mixed for 3½ minutes plus or minus, until a tractable mixture develops and is then fed into a block machine set for a feed time cycle of about 2½ seconds, and a final vibration time of about 2 seconds. A standard squeeze is used to remove excess water and to develop a neat even surfaced block. Total time including return shall be about 13 seconds. The block is next steam cured for a minimum of 6 hours and air cured for a total of seven days before use.

The finished extra lightweight non-load bearing concrete block can accept any surface finish now used in the construction industry on partitions: plaster, any type of paint, epoxy finishes, ceramic or plastic tile and vinyl wall coverings, as a few examples.

From the foregoing description it will be seen that the present invention provides an improved extra lightweight block for interior walls of buildings that is fire-resistant, has excellent accoustical properties and though extra lightweight can stand extreme abuse when used as intended for non-load bearing interior partitions or walls.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What is claimed is:

1. In the process of producing an extra lightweight concrete block for non-load bearing interior partitions of buildings consisting of intermixing portions of a single aggregate, expanded perlite, with cement in a mixing machine, and gradually adding water thereto while mixing the same until the required amount of water has been supplied, the improvement which consists in using a single aggregate, expanded perlite, and in adding to the preceding mixture 50% solids concentrate of triethanolamine salt of P-dodecyl benzene sulfonic acid and 50% water and continuing the mixing until a tractable mixture is obtained, after which the mixture is fed into a block forming machine.

2. The process of claim 1, wherein said mixture comprises 10.66 cubic feet of expanded perlite to one cubic foot (one bag) of Portland cement type IIIA and a water cement ratio of 6.66 gallons of water to one cubic foot of cement.

3. The process of claim 2, wherein said triethanolamine salt of P-dodecyl benzene sulfonic acid amounts to about 0.67 to 1.0 pint.

4. The process of claim 3, wherein the expanded perlite confirms to ASTM C332 modified and as manufactured under classification as A-20 in the gradations and volumes having a total volume of prescribed mesh percentages with a maximum dry density of 8 pounds per cubic foot loose and 9 pounds per cubic foot compacted, as follows:

| GRADATION | VOLUME |
| --- | --- |
| + 8 mesh | 8 to 14% |
| + 16 mesh | 60 to 70% |
| + 30 mesh | 15 to 20% |
| + 50 mesh | 3 to 8% |
| +100 mesh | 0 to 5% |

5. The process of claim 3, wherein said expanded perlite is predampened and placed in a mixer, said amount of cement is added thereto and mixed for about one minute to intermix the same, said volume of water is gradually added thereto while the mixer is operating, said amount of triethanolamine salt of P-dodecyl benzene sulfonic acid is added thereto as the final portion of water enters the mix and the mixer is continued operating for about 3½ minutes until a tractable mixture develops.

6. The process of claim 5, wherein said tractable mixture is fed into a block forming machine set for a feed time cycle of 2¼ seconds and a final vibration time of 2 seconds, the tractable mixture is then squeezed to remove excess water to develop an even surfaced block, for a complete time period including return of 13 seconds.

7. The process of claim 6, wherein the block is removed from the forming machine and is steam cured for a minimum of 6 hours.

8. The process of claim 7, wherein the block is air cured for a period of 7 days.

9. A lightweight block for interior partitions of buildings consisting only of a mixture of 10.66 cubic feet of expanded perlite weighing 8 pounds per cubic foot loose and 9 pounds per cubic foot compacted, 1 cubic foot (1 bag) of high-early strength Portland cement type IIIA weighing 94 pounds per cubic foot, a water cement ratio of 6.66 gallons of water to one cubic foot of cement, and 0.67 to one pint of an additive consisting of 50% solids concentrate of triethanolamine salt of P-dodecyl benzene sulfonic acid and 50% water.

* * * * *